United States Patent
Takahashi

(10) Patent No.: US 10,647,200 B2
(45) Date of Patent: May 12, 2020

(54) VEHICULAR DISPLAY DEVICE

(71) Applicant: Yazaki Corporation, Tokyo (JP)

(72) Inventor: Nobuyuki Takahashi, Susono (JP)

(73) Assignee: Yazaki Corporation, Tokyo (JP)

( * ) Notice: Subject to any disclaimer, the term of this patent is extended or adjusted under 35 U.S.C. 154(b) by 173 days.

(21) Appl. No.: 15/910,363

(22) Filed: Mar. 2, 2018

(65) Prior Publication Data

US 2018/0186237 A1 Jul. 5, 2018

Related U.S. Application Data

(60) Division of application No. 14/963,621, filed on Dec. 9, 2015, now abandoned, which is a continuation of
(Continued)

(30) Foreign Application Priority Data

| Jun. 13, 2013 | (JP) | 2013-124536 |
| Jun. 13, 2013 | (JP) | 2013-124537 |
| Jun. 13, 2013 | (JP) | 2013-124538 |

(51) Int. Cl.
  *G02B 5/02* (2006.01)
  *G02B 27/01* (2006.01)
  (Continued)

(52) U.S. Cl.
  CPC ............ B60K 35/00 (2013.01); B60K 37/04 (2013.01); G02B 5/0221 (2013.01);
  (Continued)

(58) Field of Classification Search
  CPC ........ G02B 5/02; G02B 5/0284; G02B 27/01; G02B 27/0101; G02B 27/0172;
  (Continued)

(56) References Cited

U.S. PATENT DOCUMENTS

| 6,542,305 B2* | 4/2003 | Nakamura | G02B 27/0101 |
| | | | 359/630 |
| 7,298,557 B2* | 11/2007 | Dobschal | G02B 27/0101 |
| | | | 345/7 |
| 2014/0253821 A1* | 9/2014 | Takatoh | B60K 35/00 |
| | | | 349/11 |

FOREIGN PATENT DOCUMENTS

| JP | 2007-148092 A | 6/2007 |
| JP | 2013-032087 A | 2/2013 |

OTHER PUBLICATIONS

International Search Report dated Sep. 9, 2014, issued for PCT/JP2014/065478.

(Continued)

*Primary Examiner* — Jie Lei
(74) *Attorney, Agent, or Firm* — Locke Lord LLP

(57) ABSTRACT

Provided is a vehicular display device that offers good visibility without causing a passenger to feel uncomfortable. In a bezel that includes a cover portion arranged above a display unit of a vehicular display device and a frame portion enclosing the cover portion, a front-side end portion of the cover portion is arranged at a position lower than a rear-side end portion. As a result, external light is reflected forward. Moreover, a front frame includes a reflecting plate, a semi-transparent output plate covering over the reflecting plate, and a light-collecting portion collecting external light that enters from a front into a space enclosed by the reflecting plate and the output plate. As a result, the front frame is prevented from being darkly reflected onto a front glass.

8 Claims, 9 Drawing Sheets

Related U.S. Application Data application No. PCT/JP2014/065478, filed on Jun. 11, 2014.

(51) Int. Cl.
*B60K 35/00* (2006.01)
*B60K 37/04* (2006.01)

(52) U.S. Cl.
CPC ....... *G02B 5/0284* (2013.01); *G02B 27/0101* (2013.01); *B60K 2370/1529* (2019.05); *B60K 2370/20* (2019.05); *B60K 2370/37* (2019.05); *B60K 2370/39* (2019.05); *B60K 2370/693* (2019.05); *G02B 2027/0118* (2013.01)

(58) Field of Classification Search
CPC .............. G02B 27/0103; G02B 27/017; G02B 2027/0118; G02B 5/0221; B60K 35/00; B60K 2350/92; B60K 2350/072; B60K 2350/1068; B60K 2350/2052; B60K 2350/2069; B60K 2350/2095; B60K 2350/2078; B60K 37/04; B60K 2370/37; B60K 2370/20; B60K 2370/39; B60K 2370/639; B60K 2370/1529; G09G 3/003; B60R 1/00
USPC .................. 359/599, 13, 630, 631; 345/7–9; 348/115, 118; 353/13, 28
See application file for complete search history.

(56) References Cited

OTHER PUBLICATIONS

Notification of Reasons for Refusal draftedOct. 26, 2016, issued for the Japanese patent application No. 2013-124537 and English translation thereof.
English translation of JP 2013-32087, machine translated on Dec. 14, 2017.

\* cited by examiner

VEHICULAR DISPLAY DEVICE

This application is a divisional application of U.S. application Ser. No. 14/963,621 filed on Dec. 9, 2015. U.S. application Ser. No. 14/963,621 is a Continuation of Application PCT/JP2014/065478 filed on Jun. 11, 2014, which claims the right of priority under 35 U.S.C. § 119 based on Japanese Patent Application Nos. 2013-124537 filed on Jun. 13, 2013; 2013-124536 filed on Jun. 13, 2013 and 2013-124538 filed on Jun. 13, 2013. The entire contents of these applications are incorporated herein by reference in their entirety.

TECHNICAL FIELD

The present invention relates to a vehicular display device arranged on an instrument panel and projecting an image onto a front glass.

BACKGROUND ART

In the related art, a device that has a display unit arranged in an instrument panel and projects an image onto a front glass is proposed as a vehicular display device (e.g., see Patent Literature 1). In the vehicular display device described in Patent Literature 1, the display unit upwardly projects an image from an aperture portion formed in the instrument panel onto the front glass. Moreover, a bezel that includes a cover portion covering over the display unit and a frame portion enclosing the cover portion is arranged in the aperture portion, and the cover portion protects the display unit from dust, moisture, and the like.

CITATION LIST

Patent Literatures

Patent Literature 1: JP 2007-148092 A
Patent Literature 2: JP 2008-40091 A

SUMMARY OF INVENTION

Technical Problem

However, in the vehicular display device described in Patent Literature 1, as shown in FIG. 10, a frame portion 101 is arranged on substantially the same plane as an instrument panel I. Moreover, a cover portion 102 is faced upward, and external light such as sunlight reflected by the cover portion 102 occasionally reaches an eye point EP of a passenger (driver, particularly) and disadvantageously causes the passenger to feel uncomfortable.

Incidentally, in order to prevent reflected light by the cover portion from being directed toward a passenger, a configuration as shown in FIG. 11 is conceivable where a cover portion 202 is arranged to be front tilted downward such that a vehicle front side of the cover portion 202 is lower than a rear side. According to such a configuration, light reflected by the cover portion 202 can be prevented from being directed forward and causing the passenger to feel uncomfortable.

However, in the configuration where the cover portion 202 is front tilted downward, external light becomes less likely to reach an inner surface 203 of a frame portion 201 on a front side, and when a bezel is reflected onto a front glass F due to external light, the inner surface 203 is reflected darkly as compared to other portions and this portion is highlighted to disadvantageously lower visibility. Particularly, in a display device that projects an image onto a front glass, while an image is formed such that a passenger focuses on the image at a remote point, such a reflection is focused at a relatively near point for the passenger. For this reason, when the passenger focuses on an image projected by the display device, a left and right parallax occurs in the reflection. For this reason, visibility is likely to lower.

An object of the present invention is to provide a vehicular display device that offers good visibility without causing a passenger to feel uncomfortable.

Additionally, there is proposed a vehicular display device in which, in order to prevent reflected light by a cover portion from being directed toward a passenger, the cover portion is arranged to be front tilted downward such that a vehicle front side of the cover portion is lower than a rear side (e.g., see Patent Literature 2). In the vehicular display device described in Patent Literature 2, as shown in FIG. 12, a cover portion 302 is arranged to be front tilted downward. As a result, external light is prevented from entering an eye point EP of a passenger (driver, particularly) and causing the passenger to feel uncomfortable.

However, in the vehicular display device described in Patent Literature 2, the cover portion 302 is supported by a frame portion 301 extending substantially vertical to an instrument panel I. For this reason, disadvantageously, it has been necessary to separately arrange the instrument panel I and the frame portion 301, and cost increases by the number of parts and the number of manufacturing processes increases cost.

Furthermore, when external light that enters from a front, external light reaches the instrument panel I, but does not reach a rear side-facing surface 303 on a front side of a frame portion 301. Disadvantageously, a portion near the surface 303 is darkly reflected onto a front glass F, and the reflection is highlighted to lower visibility. Particularly, in a display device that projects an image onto a front glass, while an image is formed such that a passenger focuses on the image at a remote point, such a reflection is focused at a relatively near point for the passenger. For this reason, when the passenger focuses on an image projected by the display device, a left and right parallax occurs. For this reason, visibility is likely to lower.

Another object of the present invention is to provide a vehicular display device that offers cost reduction and good visibility without causing a passenger to feel uncomfortable.

Solution to Problem

A vehicular display device according to the present invention is a vehicular display device for projecting an image from a counter surface facing a front glass in an instrument panel onto the front glass, the vehicular display device comprising: a display device arranged in the instrument panel and projects an image; and a bezel that includes a cover portion covering over the display device and a frame portion arranged on at least a vehicle front side of the cover portion, and is arranged on the counter surface, wherein the cover portion has a vehicle front-side end portion arranged at a position lower than a rear-side end portion, in the frame portion, a front frame arranged on the vehicle front side of the cover portion includes a reflecting plate formed to have a high reflectivity on an upper surface and tilting downward toward a vehicle rear, an output plate covering an upper side of the reflecting plate, and a light-collecting portion collecting external light such that the external light enters from a front into between the reflecting plate and the output plate, and the output plate is formed with a semi-transparent member that transmits light reflected by the reflecting plate therethrough and reflects external light.

According to the present invention as described above, the front-side end portion of the cover portion is arranged at the position lower than the rear-side end portion. As a result, external light reflected by the cover portion is prevented from being directed toward a passenger and causing the passenger to feel uncomfortable. Furthermore, light collected by the light-collecting portion is reflected by the reflecting plate and transmitted through the output plate. As a result, when the frame portion is reflected onto the front glass, the front frame can be prevented from being darkly reflected. The reflection does not become highlighted, and visibility can be prevented from lowering.

In this case, in the vehicular display device, it is preferable that the reflecting plate includes a first reflecting portion that tilts downwardly toward a rearward of the vehicle, and a second reflecting portion that is continuous with a vehicle rear-side end portion of the first reflecting portion and has a tilt angle gentler than an angle of the first reflecting portion, a first reflecting asperity portion having degree of asperity that increases toward the rearward of the vehicle is formed on an upper surface of the first reflecting portion, and a second reflecting asperity portion having degree of asperity larger than the degree of asperity of the first reflecting asperity portion is formed on an upper surface of the second reflecting portion.

According to such a configuration, the reflecting asperity portion is formed on the upper side of the reflecting plate. As a result, external light can be irregularly reflected to reduce non-uniformity of reflected light, and a reflection of the front frame onto the front glass can further be made not highlighted. Furthermore, the first reflecting asperity portion is formed to have the degree of asperity that increases toward the vehicle rear, and the second reflecting asperity portion is formed to have the degree of asperity larger than the degree of asperity of the first reflecting asperity portion. As a result, on a front side of the first reflecting portion having the small degree of asperity, collected external light is likely to be reflected toward the second reflecting portion, and on a rear side of the first reflecting portion having the large degree of asperity and the second reflecting portion, collected external light is likely to be irregularly reflected toward the output plate. Therefore, light becomes likely to be emitted from the output plate on a rear side of the reflecting plate (near the cover portion) which external light is less likely to reach, and the front frame near the cover portion can be prevented more securely from being darkly reflected onto the front glass.

Furthermore, in the vehicular display device according to the present invention, it is preferable that a diffusive asperity portion for diffusing incident light is formed on a surface of the output plate facing the reflecting plate. According to such a configuration, the diffusive asperity portion is formed on a side of the output plate facing the reflecting plate. As a result, non-uniformity of light emitted from the output plate can be reduced, and a reflection of the front frame onto the front glass can further be made not highlighted.

Additionally, in the vehicular display device according the present invention, it is preferable that the cover portion is formed to have a downward convex surface, an outer surface of the output plate is formed to have an upward convex surface, and the output plate has a lower-side end portion arranged in a vicinity of the vehicle front-side end portion of the cover portion, and an upper-side end portion arranged at a position higher than the cover portion. According to such a configuration, the lower-side end portion of the output plate is arranged in a vicinity of the cover portion, and the upper-side end portion is arranged at the position higher than the cover portion. As a result, light reflected forward by the cover portion can be shielded by the output plate, and this reflected light can be prevented from being further reflected toward a passenger by the front glass and can be prevented more securely from causing the passenger to feel uncomfortable.

Additionally, a vehicular display device according to the present invention is a vehicular display device for projecting an image from a counter surface facing a front glass in an instrument panel onto the front glass, the vehicular display device including: a display device arranged in the instrument panel and projects an image; and a bezel that includes a cover portion covering over the display device and a frame portion arranged on at least a vehicle front side of the cover portion, and is arranged on the counter surface, wherein the cover portion has a vehicle front-side end portion arranged at a position lower than a rear-side end portion, in the frame portion, a light source that irradiates light to the front glass, and an output plate covering an upper side of the light source are arranged in a front frame that is arranged on the vehicle front side of the cover portion, and the output plate is formed with a semi-transparent member that transmits the irradiation light of the light source therethrough and reflects external light.

According to the present invention as described above, the front-side end portion of the cover portion is arranged at the position lower than the rear-side end portion. As a result, external light reflected by the cover portion is prevented from being directed toward a passenger and causing the passenger to feel uncomfortable. Furthermore, a light source irradiates the front glass with light and the output plate transmits this light therethrough. As a result, when the frame portion is reflected onto the front grass, the front frame is prevented from being darkly reflected. The reflection does not become highlighted, and visibility can be prevented from lower.

On this occasion, it is preferable that the vehicular display device according to the present invention includes an illuminance sensor that measures an illuminance level of external light near the front frame, and control means that controls the light source to irradiate with light at a brightness level in accordance with the illuminance level measured by the illuminance sensor. According to such a configuration, the control means controls the light source to irradiate with light at the brightness level in accordance with an illuminance level of external light. As a result, a reflection of the front frame onto the front glass can further be made not highlighted.

Furthermore, in the vehicular display device according to the present invention, it is preferable that a diffusive plate that diffuses the irradiation light of the light source toward a space between the light source and the output plate is arranged in the front frame. According to such a configuration, the diffusive plate is arranged. As a result, the irradiation light of the light source is diffused by the diffusive plate to reduce non-uniformity, and a reflection of the front frame onto the front glass can further be made not highlighted. Additionally, light is diffused and, as a result, the number of light sources can be reduced. A configuration can be simplified and the number of parts can be reduced to achieve cost reduction.

Additionally, in the vehicular display device according to the present invention, it is preferable that a diffusive asperity portion for diffusing incident light is formed on a surface of the output plate facing the light source. According to such a configuration, the diffusive asperity portion is formed on a side of the output plate facing the light source. As a result, non-uniformity of light emitted from the output plate can be reduced, and a reflection of the front frame onto the front glass can further be made not highlighted.

Additionally, in the vehicular display device according to the present invention, it is preferable that the cover portion is formed to have a downward convex surface, an outer surface of the output plate is formed in an upward convex manner, and the output plate has a lower-side end portion arranged in a vicinity of the vehicle front-side end portion of the cover portion, and a peak portion arranged at a position higher than the cover portion. According to such a configuration, the lower-side end portion of the output plate is arranged in a vicinity of the cover portion, and the peak portion is arranged at the position higher than the cover portion. As a result, light reflected forward by the cover portion can be shielded by the output plate, and this reflected light can be prevented from being further reflected toward a passenger by the front glass, and can be prevented more securely from causing the passenger to feel uncomfortable.

A vehicular display device according to the present invention is a vehicular display device for projecting an image from a counter surface facing a front glass in an instrument panel onto the front glass, and including a display device arranged in the instrument panel, and a bezel arranged on the counter surface portion, wherein the bezel has a cover portion covering over the display device, and a frame portion arranged around the cover portion, the cover portion has a vehicle front-side end portion arranged at a position lower than a rear-side end portion, and in the frame portion, a front frame arranged on a front side of the cover portion is arranged to tilt downwardly from a vehicle front side toward a vehicle rear side.

According to the present invention as described above, the front frame tilts downward toward the rear side, in other words, the front frame does not have a portion folded forward to become an undercut portion. As a result, the front frame and the instrument panel can be molded integrally and punched out by using an upper and lower pair of molds, and the number of parts and the number of manufacturing processes can be reduced to achieve cost reduction. Furthermore, external light also becomes likely to reach a rear side of the front frame (i.e., near the cover portion). When the frame portion is reflected onto the front glass, the front frame is prevented from being darkly reflected. The reflection does not become highlighted, and visibility can be prevented from lower. Additionally, the front-side end portion of the cover portion is arranged at the position lower than the rear-side end portion. As a result, external light reflected by the cover portion is prevented from being directed forward or upward to be directed toward a passenger and causing the passenger to feel uncomfortable.

On this occasion, in the vehicular display device according the present invention, it is preferable that the cover portion is formed to have a downward convex surface, and the vehicle front-side end portion of the cover portion and a rear-side end portion of the front frame are arranged to include, on a boundary where the vehicle front-side end portion of the cover portion and the rear-side end portion of the front frame abut against each other, a curved surface formed by continuous upper surfaces of the vehicle front-side end portion of the cover portion and the rear-side end portion of the front frame. According to such a configuration, the vehicle front-side end portion of the cover portion and the rear-side end portion of the front frame have the curved surface formed by the continuous upper surfaces, on the boundary between the front-side end portion of the cover portion and the rear-side end portion of the front frame. As a result, the boundary between the cover portion and the front frame is formed smoothly, and a reflection onto the front glass can be made not highlighted.

Furthermore, in the vehicular display device according to the present invention, it is preferable that the front frame is formed to have an upward convex surface, and a vehicle front-side end portion of the front frame is arranged to include, on a boundary where the vehicle front-side end portion of the front frame abuts against the counter surface portion, a curved surface formed by continuous upper surfaces of the vehicle front-side end portion of the front frame and the counter surface portion. According to such a configuration, the front frame is formed to have an upward convex surface. As a result, the upper surface is smoothly formed and a reflection onto the front glass can be made not highlighted. Additionally, the front frame has the curved surface formed by the continuous upper surfaces of the front-side end portion and the counter surface. As a result, the boundary between the front frame and the counter surface portion of the instrument panel is smoothly formed and a reflection onto the front glass can be made not highlighted.

Additionally, in the vehicular display device according to the present invention, it is preferable that the frame portion is formed to have the front frame, a rear frame arranged on a vehicle rear side of the cover portion, and left and right frames arranged on both sides in a vehicle width direction of the cover portion, the front frame is arranged to form an obtuse angle made between a first tangent plane being in contact with an upper surface of a vehicle front-side end portion and a second tangent plane being in contact with an upper surface of a rear-side end portion, the rear frame is arranged on the same plane as the counter surface portion or arranged to form an obtuse angle with respect to the counter surface portion, and the left and right frames are arranged to form obtuse angles with the counter surface portion to be continuous with the counter surface portion.

According to such a configuration, the frame portions arranged on the front, rear, left, and right of the cover portion are arranged to form obtuse angles with the counter surface portion, or arranged on the same plane. As a result, all sides of the cover portion can be enclosed by the frame portion, and the frame portion and the instrument panel can be molded integrally. While the cover portion is securely hold, the number of parts and the number of manufacturing processes can be reduced to achieve cost reduction. Additionally, the first tangent plane and the second tangent plane form an obtuse angle. As a result, the front frame slightly tilts and can be punched out easily after molding.

Advantageous Effects of Invention

According to the vehicular display device according to the present invention as described above, the vehicle front-side end portion of the cover portion is arranged at the position lower than the rear-side end portion. As a result, it is possible to prevent causing the passenger to feel uncomfortable. Moreover, external light collected by the light-collecting portion is reflected by the reflecting plate and emitted from the output plate. As a result, good visibility can be achieved.

Additionally, the vehicle front-side end portion of the cover portion is arranged at the position lower than the rear-side end portion. As a result, it is possible to prevent causing the passenger to feel uncomfortable. Moreover, the light source irradiates the front glass with light, and the output plate transmits this light therethrough. As a result, good visibility can be achieved.

Additionally, the vehicle front-side end portion of the cover portion is arranged at the position lower than the rear-side end portion. As a result, it is possible to prevent causing the passenger to feel uncomfortable. Additionally, the front frame tilts downward toward the rear side. As a result, good visibility and cost reduction can be achieved.

DESCRIPTION OF EMBODIMENTS

Hereinafter, embodiments of the present invention will be described with reference to the drawings.

First Embodiment

Figure 1:
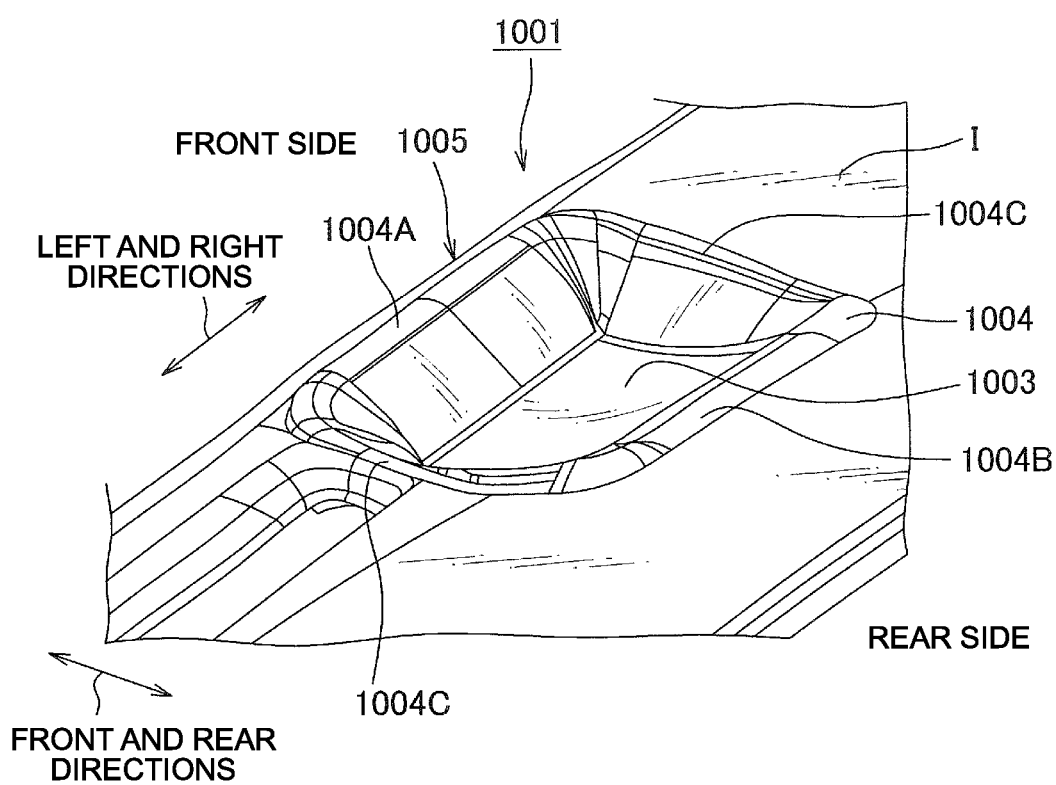
FIG. 1 is a perspective view showing a vehicular display device according to a first embodiment of the present invention.
Figure 2:
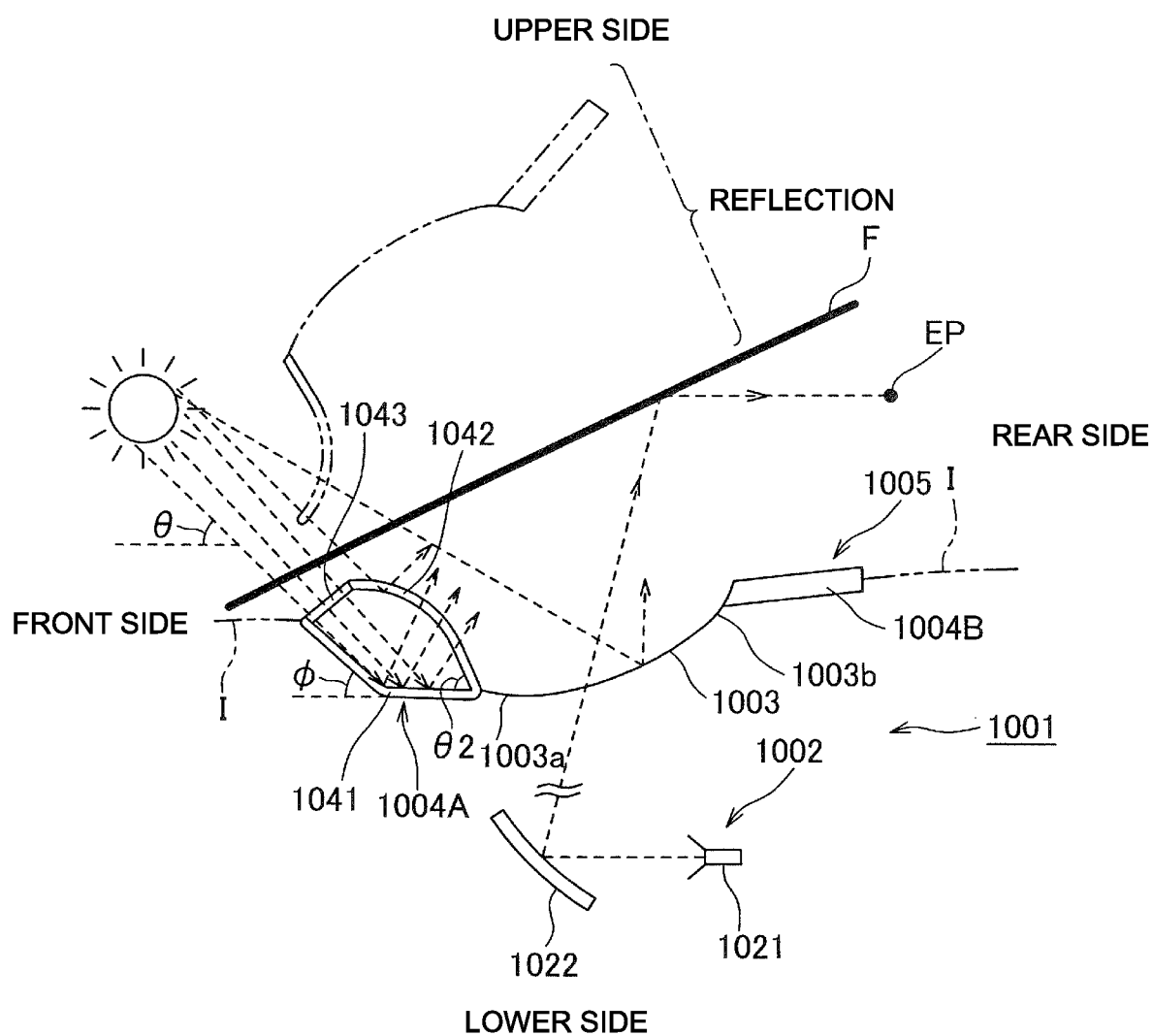
FIG. 2 is a side view showing the vehicular display device.

In FIGS. 1 and 2, a vehicular display device 1001 according to a first embodiment is a device for reflecting any image onto a front glass F of a vehicle. The vehicular display device 1001 is configured to include a display unit 1002 serving as a display device arranged inside an instrument panel I and projects an image, a cover portion 1003 covering over the display unit 1002, and a frame portion 1004 enclosing all sides of the cover portion 1003, and the cover portion 1003 and the frame portion 1004 form a bezel 1005. In this embodiment, front and rear directions, and left and right directions are as shown in FIG. 1, and up and down directions are as shown in FIG. 2.

The display unit 1002 is configured to have a display source 1021 projecting an image forward, and a mirror 1022 reflecting the image projected by the display source 1021 upward, and a driver focuses on the image at a remote point.

The cover portion 1003 is a translucent plane material that has a downward convex surface and has a substantially rectangular shape when seen from top. The cover portion 1003 is arranged to be supported by the frame portion 1004, and have a front-side end portion 1003a disposed at a position lower than a rear-side end portion 1003b, a lower end near the front-side end portion 1003a, and an upper end near the rear-side end portion 1003b.

Figure 3:
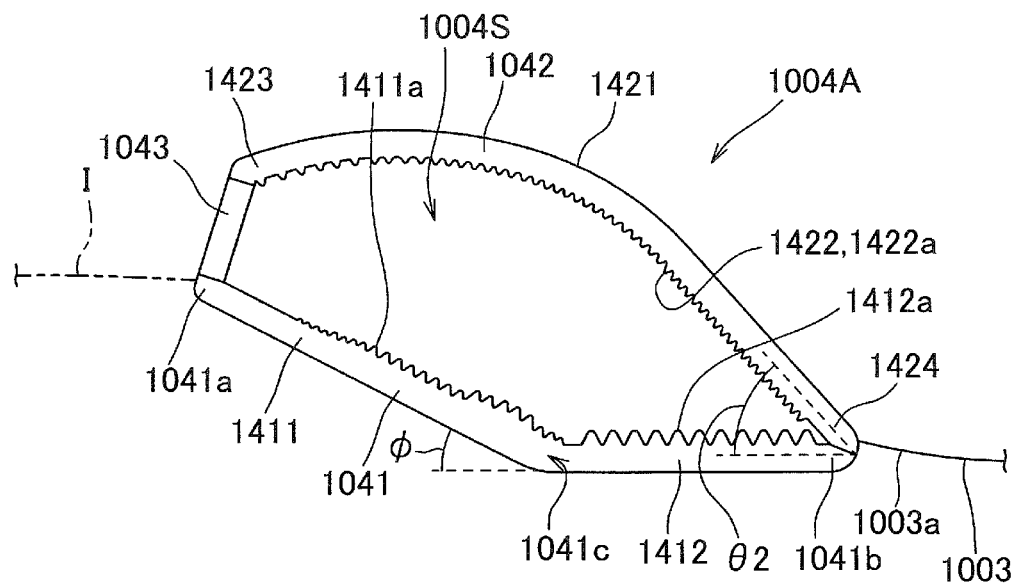
FIG. 3 is an enlarged side view showing a key portion of the vehicular display device.

The frame portion 1004 includes a front frame 1004A, a rear frame 1004B, and left and right frames 1004C, and is supported by being fitted to an aperture portion arranged in the instrument panel I. As shown in an enlarged view of FIG. 3, the front frame 1004A is configured to have a reflecting plate 1041 with a high reflectivity having a front-side end portion 1041a supported by the instrument panel I and a rear-side end portion 1041b supporting the front-side end portion 1003a of the cover portion 1003, an output plate 1042 standing from the rear-side end portion 1041b of the reflecting plate 1041, covering the reflecting plate 1041 and extending forward over the front-side end portion 1041a, and a light-collecting portion 1043 arranged between the front-side end portion 1041a of the reflecting plate 1041 and a front-side end portion 1423 of the output plate 1042. Upper side surfaces of the rear frame 1004B and the left and right frames 1004C are substantially the same in color and gloss as the instrument panel I, and are formed such that when the upper side surfaces are reflected onto the front glass F, a boundary between the upper side surfaces and the instrument panel I does not become highlighted.

The reflecting plate 1041 is configured to have a first reflecting portion 1411 extending rearward from the front-side end portion 1041a and tilting downward, and a second reflecting portion 1412 continuous with the rear-side end portion 1041c of the first reflecting portion 1411 and substantially horizontally extending rearward to the rear-side end portion 1041b of the reflecting plate 1041. A first reflecting asperity portion 1411a is formed on an upper side surface of the first reflecting portion 1411, and a second reflecting asperity portion 1412a is formed on an upper side surface of the second reflecting portion 1412. The first reflecting asperity portion 1411a is formed so as to have degree of asperity that increases toward the rear side, and the second reflecting asperity portion 1412a is formed so as to have degree of asperity larger than that of the first reflecting asperity portion 1411a.

The output plate 1042 has an outer upper surface 1421 that is substantially the same in color and gloss as the instrument panel I. External light is reflected by the upper surface 1421, and light is transmitted through a lower surface 1422 facing the reflecting plate 1041 and emitted from the upper surface 1421 with substantially the same color as that of the reflected light. Additionally, the output plate 1042 is formed with a plane material having an upward convex surface, and a diffusive asperity portion 1422a is formed on the lower surface 1422. The front-side end portion 1423 is disposed at a position higher than the rear-side end portion 1003b of the cover portion 1003, and a rear-side end portion 1424 abuts against the front-side end portion 1003a of the cover portion 1003. Note that in this embodiment, the front-side end portion 1423 of the output plate 1042 is an upper-side end portion, and the rear-side end portion 1424 is a lower-side end portion.

The light-collecting portion 1043 is formed with a translucent plane material such as a resin and glass, and is arranged so as to collect external light (for example, sunlight) into a space 1004S enclosed by the reflecting plate 1041 and the output plate 1042.

Next, reflection of external light by the front frame 1004A will be described. In this embodiment, an angle of external light with respect to a horizontal surface is θ, and an angle of the first reflecting portion 1411 with respect to a horizontal surface is ϕ). When θ is smaller than ϕ, external light is less likely to reach the upper surface 1421 of the output plate 1042, but is likely to reach near the rear-side end portion 1041b in the second reflecting portion 1412, and is irregularly reflected by the second reflecting portion 1412. When θ is substantially equal to ϕ), external light is reflected near the front-side end portion 1423 of the upper surface 1421, collected into the space 1004S along the first reflecting portion 1411, and irregularly reflected by the second reflecting portion 1412.

When θ is larger than ϕ, external light is reflected by the upper surface 1421, collected into the space 1004S, and reflected by the first reflecting portion 1411. Since the first reflecting asperity portion 1411a is formed so as to have degree of asperity that increases toward the rear side, the first reflecting portion 1411 is likely to reflect external light near the front-side end portion 1041a toward the second reflecting portion 1412, and the first reflecting portion 1411 is likely to irregularly reflect external light near the rear-side end portion 1041c (i.e., a boundary with the second reflecting portion 1412). External light reflected by the first reflecting portion 1411 toward the second reflecting portion 1412 is irregularly reflected by the second reflecting portion 1412. When θ approaches 90 degree, external light is less likely to be collected into the space 1004S, but is likely to be reflected by the entire upper surface 1421.

That is, when θ is small, external light is likely to be irregularly reflected by the second reflecting portion 1412, and when θ is large, external light is likely to be reflected by the upper surface 1421. In both the cases, light transmitted through the output plate 1042 or light reflected by the output plate 1042 is directed toward the front glass F.

Additionally, when θ is smaller than θ2 that is an angle of the rear-side end portion 1424 of the output plate 1042 with respect to a horizontal surface, external light is shielded by the output plate 1042 not to reach the cover portion 1003, and external light is prevented from being reflected by the cover portion 1003 and reaching a direct eye point EP. On the other hand, when θ is larger than θ2 (i.e., when external light enters from above or behind), light reflected forward by the cover portion 1003 is shielded by the output plate 1042.

According to this embodiment, there are the following effects. That is, the front-side end portion 1003a of the cover portion 1003 is disposed at the position lower than the rear-side end portion 1003b. As a result, external light reflected by the cover portion 1003 is not directed forward and does not enter the eye point EP, and it is possible to prevent causing a passenger to feel uncomfortable.

Furthermore, light transmitted through the output plate 1042 or light reflected by the output plate 1042 is directed toward the front glass F. As a result, the front frame 1004A is prevented from being reflected darkly, and a reflection of the front frame 1004A onto the front glass F becomes the same as reflections of the rear frame 1004B, the left and right frames 1004C, and the instrument panel I. The enter reflection is not highlighted, and good visibility can be maintained.

Additionally, the first reflecting asperity portion 1411a is formed so as to have the degree of asperity that increases toward the rear side, and the second reflecting asperity portion 1411b is formed so as to have the degree of asperity larger than that of the first reflecting asperity portion 1411a. As a result, the front frame 1004A can be prevented from being reflected onto the front glass F near the rear-side end portion 1041b of the reflecting plate 1041 which collected external light is less likely to reach. Furthermore, light is irregularly reflected by the reflecting asperity portions 1411a and 1411b. As a result, non-uniformity of reflected light can be reduced, and a reflection of the front frame 1004A onto the front glass F can further be made not highlighted.

Additionally, the diffusive asperity portion 1422a is formed on the lower surface 1422 of the output plate 1042, and, as a result, incident light onto the output plate 1042 is diffused. Non-uniformity of output light from the upper surface 1421 can be reduced, and a reflection of the front frame 1004A onto the front glass F can further be made not highlighted.

Additionally, the front-side end portion 1423 of the output plate 1042 is disposed at the position higher than the rear-side end portion 1003b of the cover portion 1003, and the rear-side end portion 1424 abuts against the front-side end portion 1003a of the cover portion 1003. As a result, external light reflected forward by the cover portion 1003 is shielded by the upper surface 1421 of the output plate 1042, and external light can be prevented from being reflected further by the front glass F and directed toward a passenger.

Note that the present invention is not limited to the first embodiment, but includes other configurations and the like that can achieve the objects of the present invention, and also includes the following modifications and the like. For example, in the first embodiment, the reflecting plate 1041 is configured to include the first reflecting portion 1411 and the second reflecting portion 1412, and both of the reflecting portions have different tilt angles. However, the reflecting plate 1041 may be arranged between the instrument panel I and the cover portion 1003 at a constant angle, or may have a downward convex surface. According to such configurations, the reflecting plate 1041 can be simplified.

Additionally, the first reflecting asperity portion 1411a and the second reflecting asperity portions 1411b that have the different degree of asperity are formed in the reflecting plate 1041. However, the reflecting asperity portions may have constant degree of asperity, or may be omitted. When the reflecting asperity portions have the constant degree of asperity, the reflecting plate can be simplified, and when the reflecting asperity portions are omitted, the reflecting plate can further be simplified.

Additionally, in the first embodiment, the diffusive asperity portion 1422a is formed on the lower surface 1422 of the output plate 1042. However, the diffusive asperity portion may be omitted, and when the diffusive asperity portion is omitted, the output plate can be simplified.

Additionally, the first embodiment has the configuration where the front-side end portion 1423 of the output plate 1042 is disposed at the position higher than the rear-side end portion 1003b of the cover portion 1003. However, a position at which the front-side end portion 1423 is disposed may be substantially the same as that of the instrument panel I. According to such a configuration, the output plate 1042 is prevented from rising from an upper side surface of the instrument panel I, and the front frame 1004A can have appearance of being integrated with the instrument panel I to improve design.

Additionally, in the first embodiment, the light-collecting portion 1043 is formed with the translucent plane material. However, the light-collecting portion only needs to be configured to being capable of collecting external light into the space 1004S. The translucent plane material may be enclosed by an opaque frame material, or the front-side end portion 1041a of the reflecting plate 1041 and the front-side end portion 1423 of the output plate 1042 may be arranged with a gap and this gap may be used as the light-collecting portion. When the gap between the front-side end portions 1041a and 1423 is used as the light-collecting portion, the number of parts can be reduced to achieve cost reduction.

Additionally, in the first embodiment, the frame portion 1004 is supported by being fitted to the aperture portion arranged in the instrument panel I. However, a member supporting the frame portion may be arranged in the display unit and the front frame may be supported from below.

Second Embodiment

Figure 4:
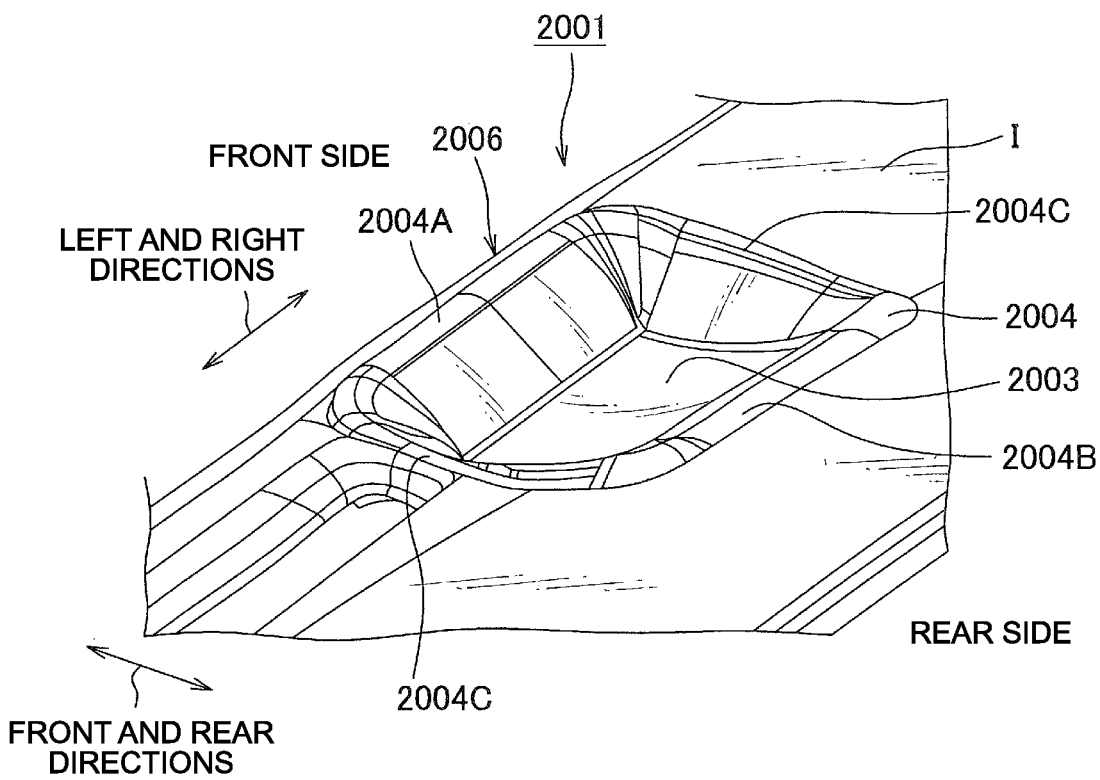
FIG. 4 is a perspective view showing a vehicular display device according to a second embodiment of the present invention.
Figure 5:
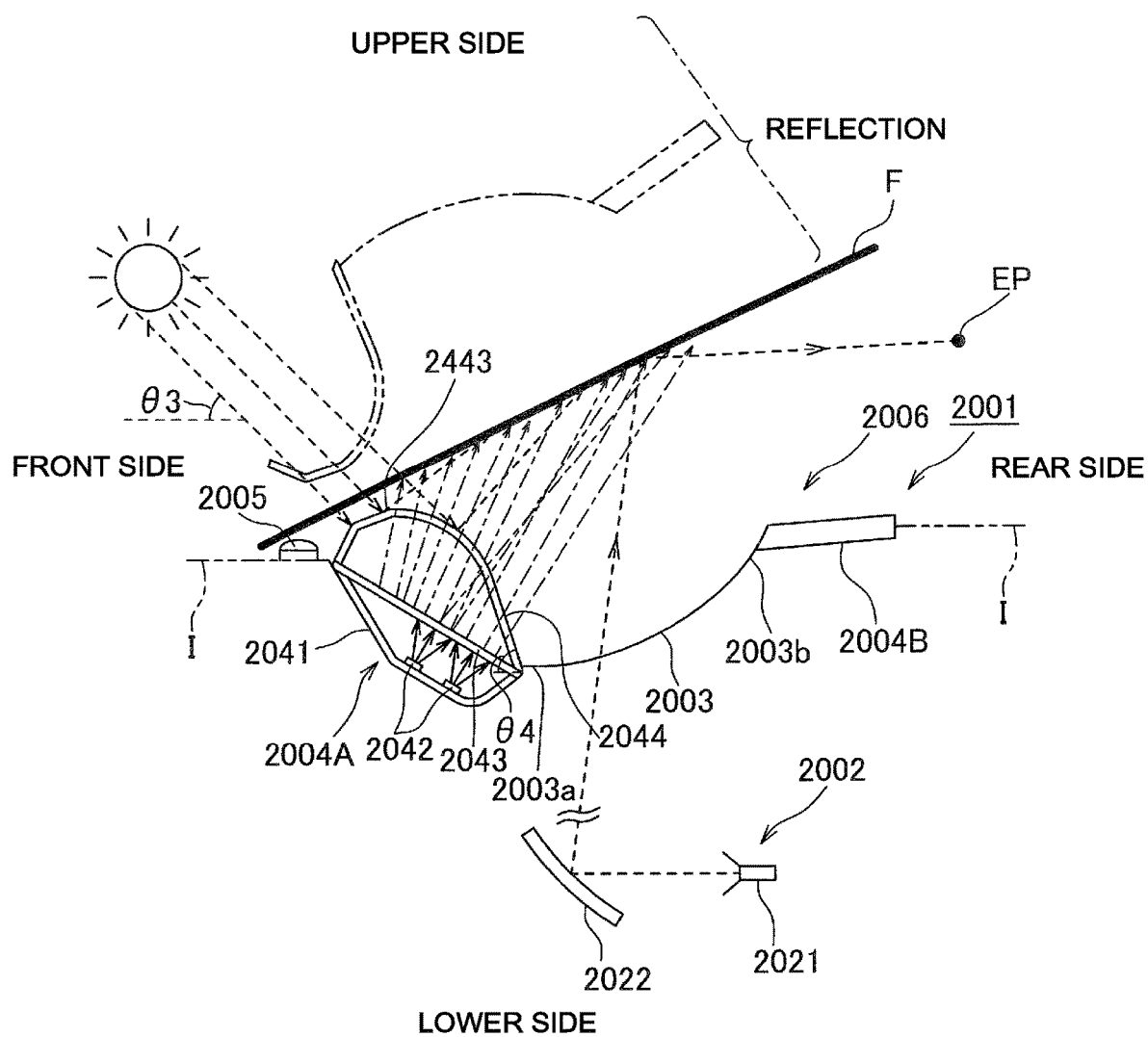
FIG. 5 is a side view showing the vehicular display device.

Hereinafter, a second embodiment of the present invention will be described with reference to the drawings. In FIGS. 4 and 5, a vehicular display device 2001 according to this embodiment is a device for reflecting any image onto a front glass F of a vehicle. The vehicular display device 2001 is configured to include a display unit 2002 serving as a display device arranged inside an instrument panel I and projects an image, a cover portion 2003 covering over the display unit 2002, a frame portion 2004 enclosing all sides of the cover portion 2003, and an illuminance sensor 2005 measuring an illuminance level of external light transmitted through the front glass F to reach inside the vehicle, and the cover portion 2003 and the frame portion 2004 form a bezel 2006. In this embodiment, front and rear directions, and left and right directions are as shown in FIG. 4, and up and down directions are as shown in FIG. 5.

The display unit 2002 is configured to have a display source 2021 projecting an image forward, and a mirror 2022 reflecting the image projected by the display source 2021 upward, and a driver focuses on the image at a remote point.

The cover portion 2003 is a translucent plane material that has a downward convex surface and has a substantially rectangular shape when seen from top. The cover portion 2003 is supported by the frame portion 2004, and is arranged to has a front-side end portion 2003a disposed at a position lower than a rear-side end portion 2003b, a lower end near the front-side end portion 2003a, and an upper end near the rear-side end portion 2003b.

Figure 6:
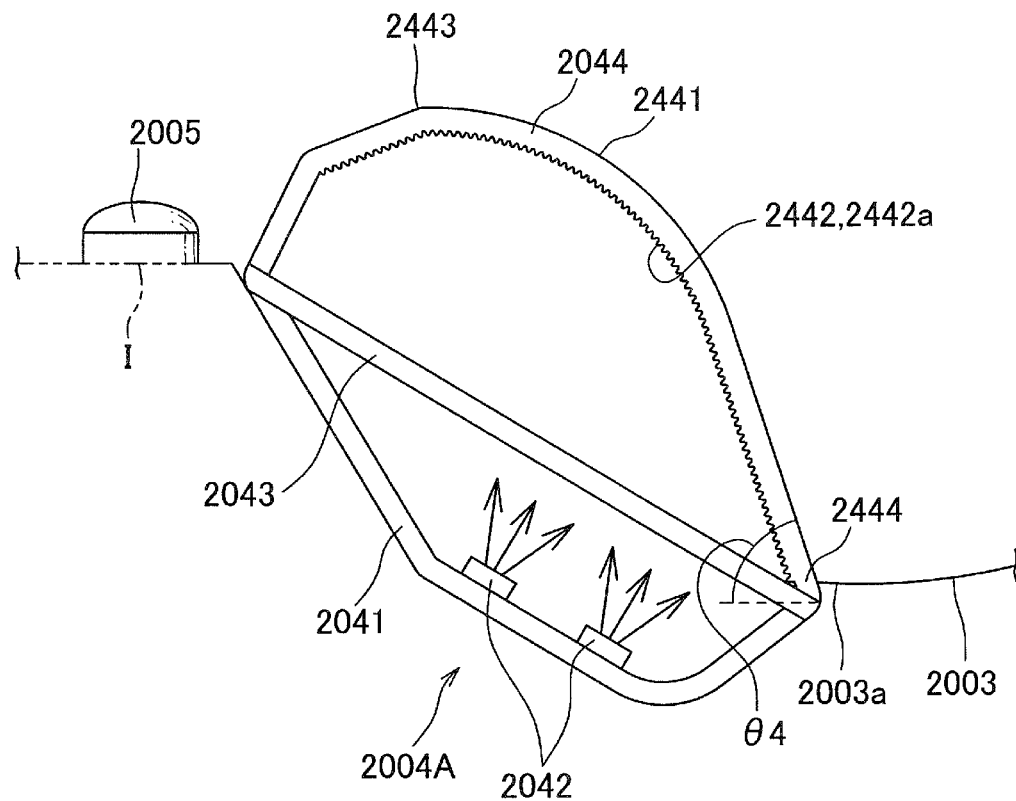
FIG. 6 is an enlarged side view showing a key portion of the vehicular display device.

The frame portion 2004 includes a front frame 2004A, a rear frame 2004B, and left and right frames 2004C, and is supported by being fitted to an aperture portion arranged in the instrument panel I. As shown in an enlarged view of FIG. 6, the front frame 2004A is configured to have a main body 2041 formed in an upward convex manner, an LED 2042 serving as a light source that is arranged on an upper surface of the main body 2041 and irradiates the front glass with light, a flat diffusive plate 2043 covering over the main body 2041 and the LED 2042 and diffusing the irradiation light, and an output plate 2044 formed in an upward convex manner and covering over the diffusive plate 2043. Upper side surfaces of the rear frame 2004B and the left and right frames 2004C are substantially the same in color and gloss as the instrument panel I, and are formed such that when the upper side surfaces are reflected onto the front glass F, a boundary between the upper side surfaces and the instrument panel I does not become highlighted.

The output plate 2044 has an outer upper surface 2441 that is substantially the same in color and gloss as the instrument panel I. External light is reflected by the upper surface 2441, and light is transmitted through a lower surface 2442 facing the main body 2041 and emitted from the upper surface 2441 with substantially the same color as that of the reflected light. Additionally, a diffusive asperity portion 2442a is formed on the lower surface 2442. A peak portion 2443 is disposed at a position higher than the rear-side end portion 2003b of the cover portion 2003, and a lower-side end portion 2444 that is a rear-side end portion abuts against the front-side end portion 2003a of the cover portion 2003.

Next, irradiation with light by the LED 2042 will be described. A front side of the output plate 2044 is likely to reflect external light. On the other hand, external light is less likely to reach a rear side of the output plate 2044. For this reason, the LED 2042 is disposed on a lower side of the main body 2041 to irradiate with light such that light is emitted from this rear side portion, and light is reflected by or transmitted through the entire output plate 2044. When the illuminance sensor 2005 arranged in front of the main body 2041 of the front frame 2004A detects external light, the illuminance sensor 2005 sends a detection signal in accordance with an illuminance level of the external light to an ECU serving as control means (not shown). The control means controls the LED 2042 to emit light at a brightness level in accordance with the detection signal. Here, a ratio of a brightness level of emitted light to an illuminance level of external light is set based on a reflectivity on the upper surface 2441 of the output plate 2044 and transmissivities of the diffusive plate 2043 and the output plate 2044, such that an illuminance level of external light reflected by the output plate 2044 becomes substantially equal to an illuminance level of irradiation light of the LED 2042 transmitted through the diffusive plate 2043 and the output plate 2044.

Next, reflection of external light will be described. When an angle θ3 of external light with respect to a horizontal surface is smaller than an angle θ4 of the lower-side end portion 2444 of the output plate 2044 with respect to a horizontal surface, external light is shielded by the output plate 2044 not to reach the cover portion 2003, and external light is prevented from being reflected by the cover portion 2003 and reaching a direct eye point EP. On the other hand, when θ3 is larger than θ4 (i.e., when external light enters from above or behind), light reflected forward by the cover portion 2003 is shielded by the output plate 2044.

According to this embodiment, there are the following effects. That is, the front-side end portion 2003a of the cover portion 2003 is disposed at the position lower than the rear-side end portion 2003b. As a result, external light reflected by the cover portion 2003 is not directed forward and does not enter a visual field of a passenger, and it is possible to prevent causing the passenger to feel uncomfortable.

Furthermore, light is reflected by or transmitted through the entire output plate 2044. As a result, the front frame 2004A is prevented from being reflected darkly, and a reflection of the front frame 2004A onto the front glass F becomes the same as reflections of the rear frame 2004B, the left and right frames 2004C, and the instrument panel I. The enter reflection is not highlighted, and good visibility can be maintained.

Additionally, the LED 2042 is controlled so as to emit light at a brightness level in accordance with an illuminance level of external light measured by the illuminance sensor 2005. As a result, it is possible to prevent non-uniformity from occurring in a reflection of the output plate 2044.

Additionally, the diffusive asperity portion 2442a is formed on the lower surface 2442 of the output plate 2044, and, as a result, incident light from the output plate 2044 is diffused. Non-uniformity of output light from the upper surface 2441 can be reduced, and a reflection of the front frame 2004A onto the front glass F can further be made not highlighted.

Additionally, the peak portion 2443 of the output plate 2044 is disposed at the position higher than the rear-side end portion 2003b of the cover portion 2003, and the lower-side end portion 2444 abuts against the front-side end portion 2003a of the cover portion 2003. As a result, external light reflected forward by the cover portion 2003 is shielded by the upper surface 2441 of the output plate 2044, and external light can be prevented from being reflected further by the front glass F and directed toward a passenger.

Note that the present invention is not limited to the second embodiment, but includes other configurations and the like that can achieve the objects of the present invention, and also includes the following modifications and the like. For example, in the second embodiment, the ECU controls the LED 2042 so as to emit light at a brightness level in accordance with an illuminance level of external light detected by the illuminance sensor 2005. However, the illuminance sensor 2005 may be omitted, and when the display unit 2002 projects an image, the LED 2042 may be controlled so as to emit light. When the illuminance sensor 2005 is omitted, the number of parts can be reduced and the control can be simplified. Additionally, when the display unit 2002 does not project an image, visibility does not lower even when a part of the front frame 2004A is darkly reflected onto the front glass F.

Additionally, in the second embodiment, the illuminance sensor 2005 sends the detection signal in accordance with an illuminance level of external light. However, the illuminance sensor 2005 may measure an angle of external light to send a signal, and a plurality of front and rear (upper and lower) LEDs may be arranged in parallel and controlled so as to emit light independently from each other. At this time, since external light is less likely to be reflected at the rear side of the output plate 2044 when the angle θ3 of external light with respect to a horizontal surface is large, the LED on the rear side is controlled to emit light at a high brightness level, and since external light is not reflected at the rear side by the peak portion 2443 when θ3 is small, the front and rear LEDs are controlled to emit light at a substantially equal brightness level. As a result of such control, even when an angle of external light varies, a reflection of the output plate 2044 onto the front glass can be uniform.

Additionally, in the second embodiment, the diffusive plate 2043 is arranged above the LED 2042. However, the diffusive plate 2043 may be omitted. For example, a light source irradiating a wide area with light may be used or a plurality of light sources may be arranged in parallel to irradiate a wide area with light.

Additionally, in the second embodiment, the diffusive asperity portion 2442a is formed on the lower surface 2442 of the output plate 2044. However, the diffusive asperity portion may be omitted. When the diffusive asperity portion is omitted, the output plate can be simplified.

Additionally, the second embodiment has the configuration where the peak portion 2443 of the output plate 2044 is disposed at the position higher than the rear-side end portion 2003b of the cover portion 2003. However, a position at which the peak portion 2443 is disposed may be substantially the same as that of the instrument panel I. According to such a configuration, the output plate 2044 is prevented from rising from above an upper side surface of the instrument panel I, and the front frame 2004A can have appearance of being integrated with the instrument panel I to improve design.

Additionally, in the second embodiment, the LED 2042 is controlled to emit light such that the output plate 2044 is reflected onto the front glass F at substantially equal brightness as that of the instrument panel I. However, the LED may be arranged to be capable of emitting light at different intensities with different colors, and may be configured such that the output plate 2044 is reflected with a different color at different brightness from those of the instrument panel I. According to such a configuration, when there is abnormality in a vehicle, a travelling state, and the like, a reflection of the output plate 2044 can be highlighted to alert a driver.

Third Embodiment

Figure 7:
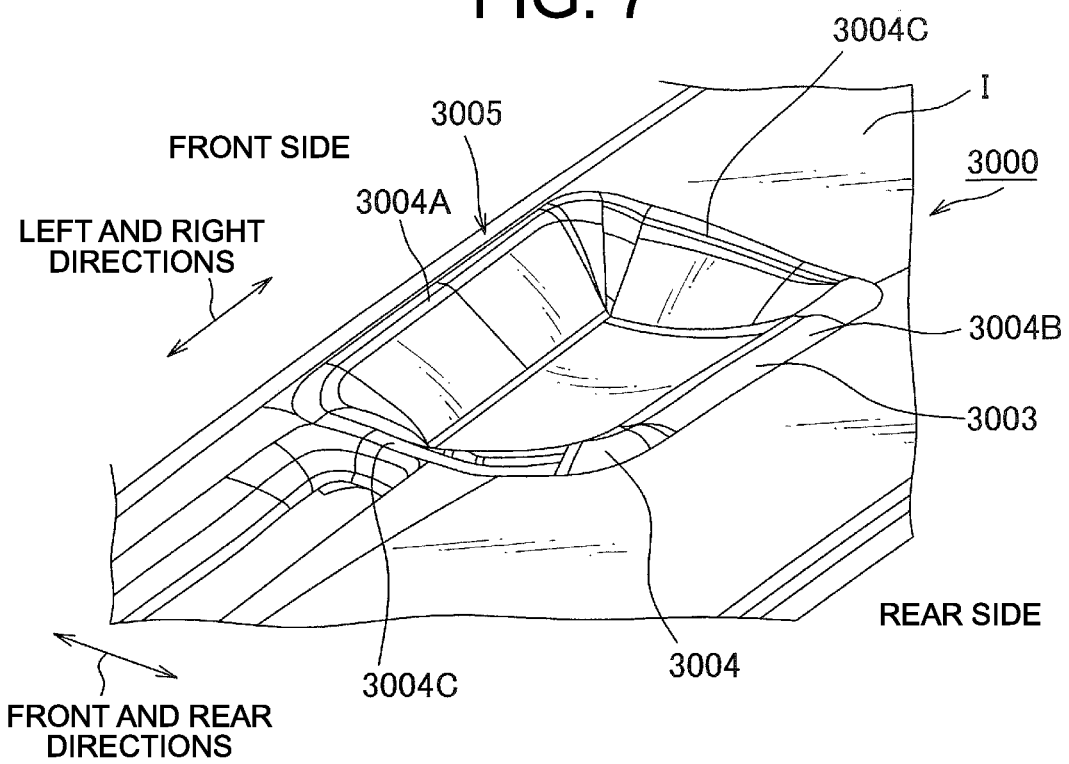
FIG. 7 is a perspective view showing a vehicular display device according to a third embodiment of the present invention.
Figure 8:
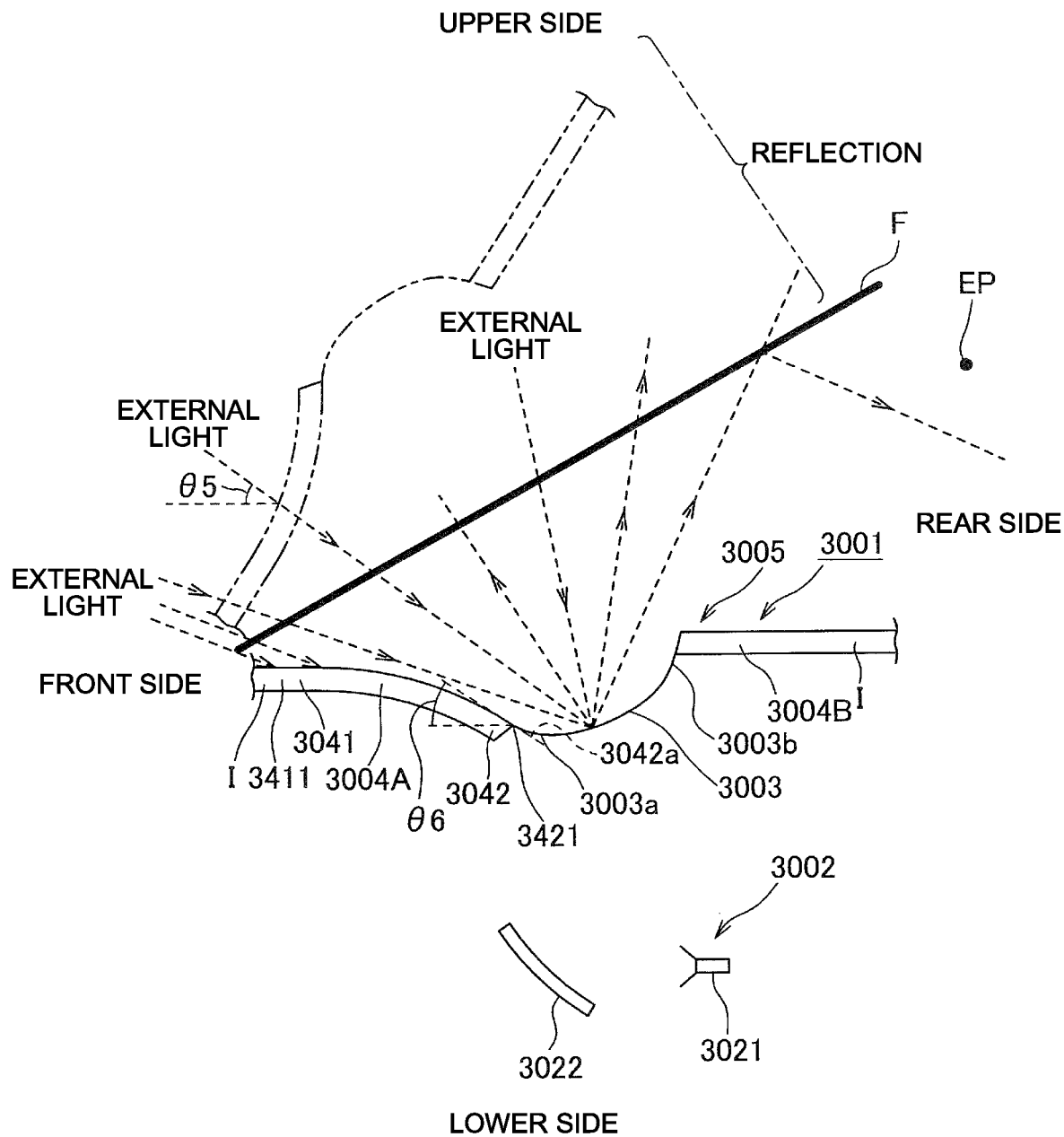
FIG. 8 is a side view showing the vehicular display device.

Hereinafter, a third embodiment of the present invention will be described with reference to the drawings. In FIGS. 7 and 8, a vehicular display device 3001 according to this embodiment is a device for reflecting any image onto a front glass F of a vehicle. The vehicular display device 3001 is configured to include a display unit 3002 serving as a display device arranged below a counter surface portion I facing the front glass F in an instrument panel and projects an image, a cover portion 3003 covering over the display unit 3002, and a frame portion 3004 enclosing all sides of the cover portion 3003, and the cover portion 3003 and the frame portion 3004 form a bezel 3005. In this embodiment, front and rear directions, and left and right directions are as shown in FIG. 7, and up and down directions are as shown in FIG. 8.

The display unit 3002 is configured to have a display source 3021 projecting an image forward and a mirror 3022 reflecting the image projected by the display source 3021 upward, and a driver focuses on the image at a remote point.

The cover portion 3003 is a translucent plane material that has a downward convex surface and has a substantially rectangular shape when seen from top. The cover portion 3003 is supported by the frame portion 3004, and is arranged to include a front-side end portion 3003a disposed at a position lower than a rear-side end portion 3003b, a lower end near the front-side end portion 3003a, and an upper end near the rear-side end portion 3003b.

Figure 9:
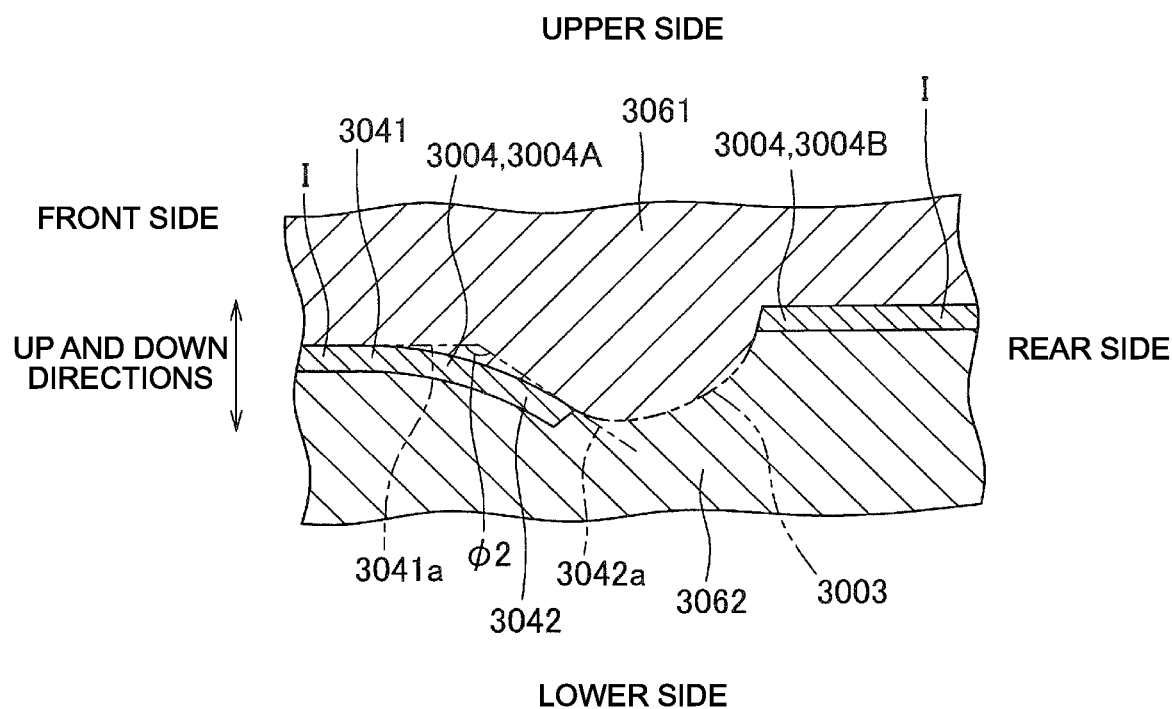
FIG. 9 is a sectional view showing molds for molding a frame portion of the vehicular display device.
Figure 10:
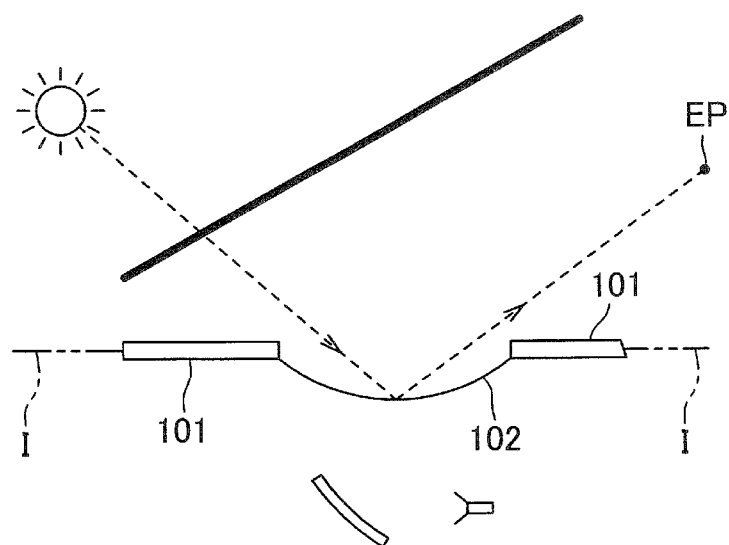
FIG. 10 is a side view showing a vehicular display device of the related art.
Figure 11:
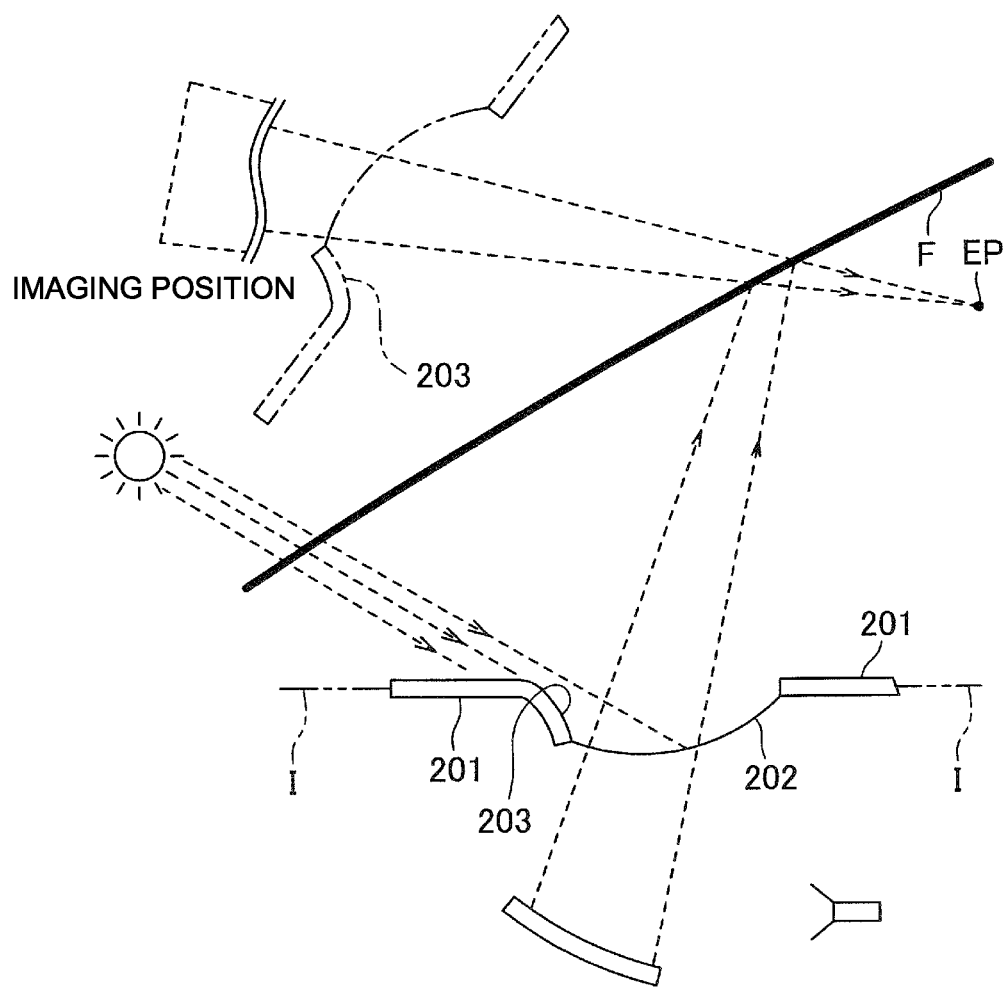
FIG. 11 is a side view showing another vehicular display device of the related art.
Figure 12:
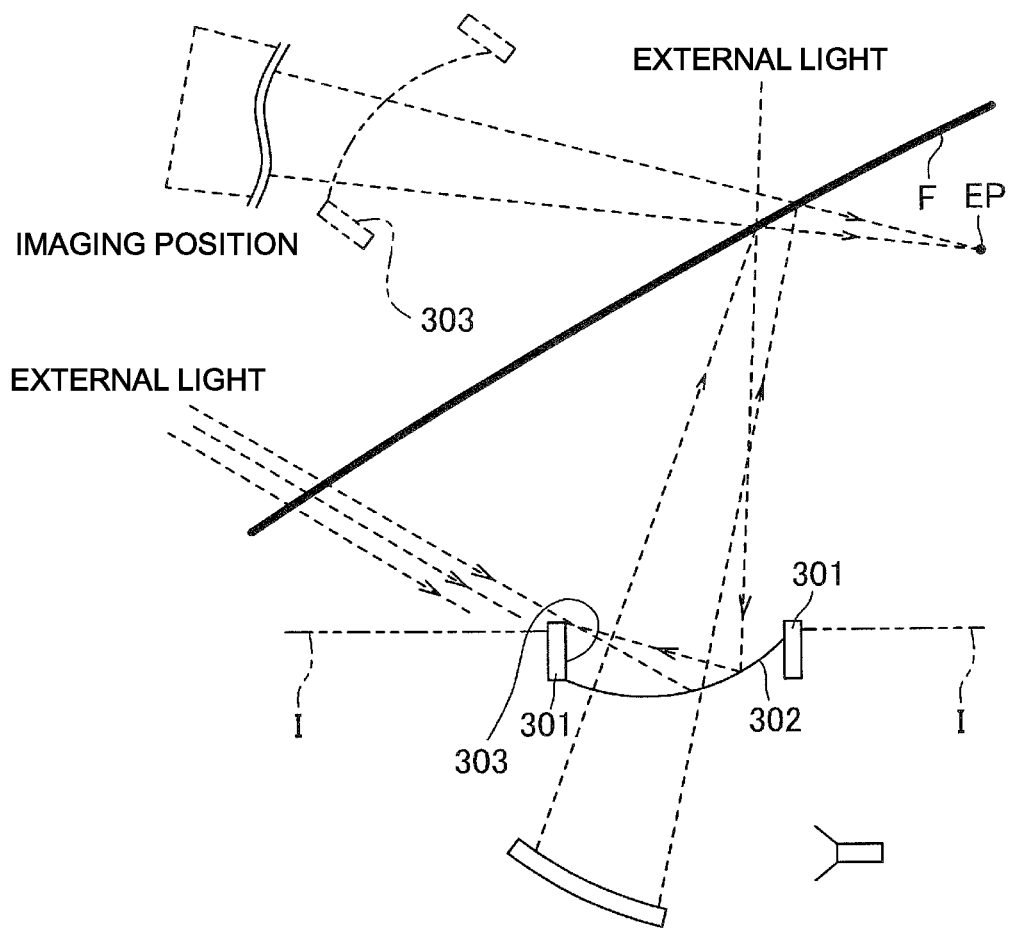
FIG. 12 is a side view showing still another vehicular display device of the related art.

The frame portion 3004 includes a front frame 3004A, a rear frame 3004B, and left and right frames 3004C, and is integrally molded with the counter surface portion I of the instrument panel. The front frame 3004A is formed to have an upward convex surface, and is arranged to tilt downwardly from a front side to a rear side. A front-side end portion 3041 of the front frame 3004A form an obtuse angle with respect to the counter surface portion I to be continuous with the counter surface portion I, and upper surfaces on a boundary 3411 of the front-side end portion 3041 and the counter surface portion I are continuous with each other to form a curved surface. A rear-side end portion 3042 abuts against the front-side end portion 3003a of the cover portion 3003, and has a curved surface formed by the rear-side end portion 3042 and the front-side end portion 3003a continuous with each other on an upper surface of a boundary 3421 between the rear-side end portion 3042 and the front-side end portion 3003a. Additionally, as shown in FIG. 9, the front frame 3004A is arranged such that an angle φ2 formed between a first tangent plane 3041a being in contact with the upper surface of the front-side end portion 3041 and a second tangent plane 3042a being in contact with the upper surface of the rear-side end portion 3042 becomes an obtuse angle. The rear frame 3004B is continuous with the counter surface portion I and extends forward, and the left and right frames 3004C form obtuse angles with the counter surface portion I to be continuous with the counter surface portion I and extend to the cover portion 3003.

Next, reflection of external light by the cover portion 3003 will be described. An upper surface of the cover portion 3003 is a curved upper, and when light incident on a front area and light incident on a rear area enter at the same angle, even though reflection angles differ, tendencies of change of reflection angle on the front and rear areas in response to a change of incident angle are equal. For this reason, in this embodiment, reflection by a substantially center portion in the front and rear directions of the cover portion 3003 will be described.

When an angle θ5 of external light with respect to a horizontal surface is smaller than an angle θ6 of the second tangent plane with respect to a horizontal surface, external light is shielded by the front frame 3004A not to reach the cover portion 3003, and external light is prevented from being reflected by the cover portion 3003 and reaching a direct eye point EP. When θ5 is larger than θ6, external light is reflected from above slightly rearward. Such reflected light has a large incident angle with respect to the front glass F (enters at an angle that is almost parallel). For this reason, part of external light is reflected by the front glass F downward and rearward, and is directed below the eye point EP. Note that reflected light having a larger incident angle with respect to the front glass F is shielded by the rear frame 3004B or the rear-side end portion 3003b of the cover portion 3003 and is prevented from being directed toward the eye point EP.

As θ5 increases, a direction of reflected light by the cover portion 3003 becomes approximately vertical to the front glass F. As an incident angle becomes approximately vertical, a reflectivity of the front glass F decreases. For this reason, when θ5 is large, reflection by the front glass F can be ignored. Therefore, regardless of the angle θ5 with respect to a horizontal surface, external light is prevented from being further reflected by the cover portion 3003 or the front glass F and reaching the eye point EP. Additionally, when θ5 further increases and external light enters from above or behind, light reflected forward by the cover portion 3003 is shielded by the front frame 3004A.

Next, a method for molding the frame portion 3004 and the instrument panel will be described with reference to FIG. 9. An upper mold 3061 and a lower mold 3062 are closed in up and down directions shown in FIG. 9 to form a cavity, and a resin material is injected into the cavity to integrally mold the frame portion 3004 and the instrument panel. After the instrument panel and the frame portion 3004 are integrally molded, the upper mold 3061 and the lower mold 3062 are opened in the up and down directions.

According to this embodiment, there are the following effects. That is, external light is prevented from being reflected by the cover portion 3003 or the front glass F and reaching the eye point EP. As a result, it is possible to prevent causing the passenger to feel uncomfortable.

Furthermore, the front frame 3004A is arranged to tilt downwardly from the front side to the rear side and, as a result, external light is likely to reach near the rear-side end portion 3042 of the front frame 3004A. A reflection of the frame portion 3004 onto the front glass F is not highlighted, and good visibility can be maintained.

Additionally, the front frame 3004A has the upward convex surface. As a result, brightness of a reflection does not change sharply, and a reflection can be made not highlighted.

Additionally, the continuous curved surfaces are formed on the upper surfaces of the boundary 3411 between the front frame 3004A and the counter surface portion I and the boundary 3421 between the front frame 3004A and the cover portion 3003. As a result, a reflection of the boundaries 3411 and 3421 onto the front glass F can be made not highlighted.

Additionally, the front frame 3004A and the left and right frames 3004C form obtuse angles with the counter surface portion I to be continuous with the counter surface portion I, and the rear frame 3004B is continuous with the counter surface portion I to extend substantially horizontally, i.e., no undercut portion is formed. As a result, the molds 3061 and 3062 can be opened after the instrument panel and the frame portion 3004 are integrally molded. Here, the angle ϕ2 formed between the first tangent plane 3041a and the second tangent plane 3042a is an obtuse angle. As a result, the front frame 3004A tilts gently and the molds can be opened easily. The instrument panel and the frame portion 3004 are integrally molded. As a result, the number of molds can be reduced, and the number of parts and the number of manufacturing processes can be reduced to achieve cost reduction.

Note that the present invention is not limited to the third embodiment, but includes other configurations and the like that can achieve the objects of the present invention, and also includes the following modifications and the like. For example, in the third embodiment, the cover portion 3003 has a downward convex surface, but the cover portion may be flat. When the cover portion 3003 is flat, a configuration can be simplified, and it becomes unnecessary to take into account a curvature of the cover portion 3003 when the display unit 3002 projects an image. Alternatively, the cover portion may be formed in a shape of a parabolic curved surface having a focal point on the front glass F and a symmetry axis substantially vertical to the front glass F. When the cover portion is formed in such a shape of a parabolic curved surface, external light passing through near the focal point and reaching the cover portion can be reflected in the direction substantially vertical to the front glass F, and this reflected light can be prevented from being further reflected by the front glass F.

Additionally, in the third embodiment, the front frame 3004A has the upward convex surface, but the front frame may be flat. When the front frame 3004A is flat, a configuration can be simplified.

Additionally, the third embodiment has the configuration where the continuous curved surface is formed on the upper surface of the boundary 3411 between the front frame 3004A and the counter surface portion I and the upper surface of the boundary 3421 between the front frame 3004A and the cover portion 3003. However, the boundaries 3411 and 3421 may be angled. When the boundaries 3411 and 3421 are configured to be angled, the front frame 3004A can abut against the cover portion 3003 at any angle, and a tilt angle of the cover portion 3003 can be set to any angle.

Additionally, in the third embodiment, the angle ϕ2 formed between the first tangent plane 3041a and the second tangent plane 3042a on the upper surface of the front frame 3004A is an obtuse angle. However, the angle ϕ2 may be a substantially right angle as long as no undercut portion is formed in the front frame 3004A. Additionally, when ϕ2 is a substantially right angle, the front-side end portion 3003a of the cover portion 3003 can be arranged at a further lower position while the front and rear-direction size of the front frame 3004A is prevented from increase, and external light can be prevented more securely from being reflected toward the eye point EP. Note that even when ϕ2 is a substantially right angle, external light reach near the rear-side end portion 3042 as described above as long as θ6 is equal to 90 degree or less (i.e., as long as the front-side end portion 3041 tilts upward toward the rear side, and good visibility can be maintained.

Additionally, in the third embodiment, the rear frame 3004B is continuous with the counter surface portion I and extends forward. However, the rear frame 3004B may be arranged to form an obtuse angle with respect to the counter surface portion I and tilt downwardly toward the front.

Additionally, in the third embodiment, the frame portion 3004 is arranged at the front, rear, left, and right of the cover portion 3003. However, it is only necessary for at least the front frame 3004A to be arranged. For example, the rear-side end portion of the cover portion may extend to the counter surface portion I, wall portions that stand upward and extend to the counter surface portion I may be arranged on both the left and right sides of the cover portion, and the rear-side end portion and the wall portions may be supported by the counter surface portion.

Additionally, in this embodiment, the frame portion 3004 and the instrument panel are molded by injecting the resin material into the cavity formed by the molds 3061 and 3062. However, the frame portion 3004 and the instrument panel may be molded integrally into the shape described in the embodiment by using appropriate molds and materials.

In addition, best configurations, methods, and the like for carrying out the present invention are disclosed in the above description, but the present invention is not limited to the above description. That is, although the present invention is particularly shown and described mainly with the specific embodiments, those skilled in the art can make a variety of modifications of the above-described embodiments in detailed configurations including shapes, materials, and numerical quantities without departing from the spirit and scope of the present invention. Therefore, the above-disclosed description that limits shapes, materials, and the like is illustrative for easy understanding of the present invention, and does not limit the present invention. Thus, descriptions using member names outside part or all of the limited shapes, materials, and other information are included in the present invention.

REFERENCE SIGNS LIST

1001 vehicular display device
1002 display unit (display device)
1003 cover portion
1004 frame portion
1005 bezel
1004*a* front frame
1041 reflecting plate
1042 output plate
1043 light-collecting portion
1411 first reflecting portion
1412 second reflecting portion
1411*a* first reflecting asperity portion
1412*a* second reflecting asperity portion
1422*a* diffusive asperity portion
2001 vehicular display device
2002 display unit (display device)
2003 cover portion
2004 frame portion
2005 illuminance sensor
2006 bezel
2004A front frame
2042 LED (light source)
2043 diffusive plate
2044 output plate
2442*a* diffusive asperity portion
3001 vehicular display device
3002 display unit (display device)
3003 cover portion
3004 frame portion
3004A front frame
3004B rear frame
3004C left and right frames
3041*a* first tangent plane
3042*b* second tangent plane
3005 bezel

The invention claimed is:

1. A vehicular display device for projecting an image from a counter surface facing a front glass in an instrument panel onto the front glass, the vehicular display device comprising:
   a display device arranged in the instrument panel and projects an image; and
   a bezel that includes a cover portion covering over the display device and a frame portion arranged on at least a vehicle front side of the cover portion, and is arranged on the counter surface, wherein
   the cover portion has a vehicle front-side end portion arranged at a position lower than a rear-side end portion,
   in the frame portion, a front frame arranged on the vehicle front side of the cover portion includes a reflecting plate formed to have a high reflectivity on an upper surface and tilting downward toward a vehicle rear, an output plate covering an upper side of the reflecting plate, and a light-collecting portion collecting external light such that the external light enters from a front into between the reflecting plate and the output plate, and
   the output plate is formed with a semi-transparent member, wherein the external light entering outside of the output plate is reflected to some extent by the output plate, and the external light collected by the light-collecting portion is reflected by the reflective plate and then transmitted to some extent through the output plate.

2. The vehicular display device according to claim 1, wherein
   the reflecting plate includes a first reflecting portion that tilts downwardly toward a rearward of the vehicle, and a second reflecting portion that is continuous with a vehicle rear-side end portion of the first reflecting portion and has a tilt angle gentler than an angle of the first reflecting portion,
   a first reflecting asperity portion having degree of asperity that increases toward the rearward of the vehicle is formed on an upper surface of the first reflecting portion, and
   a second reflecting asperity portion having degree of asperity larger than the degree of asperity of the first reflecting asperity portion is formed on an upper surface of the second reflecting portion.

3. The vehicular display device according to claim 2, wherein, a diffusive asperity portion for diffusing incident light is formed on a surface of the output plate facing the reflecting plate.

4. The vehicular display device according to claim 3, wherein
   the cover portion is formed to have a downward convex surface,
   an outer surface of the output plate is formed to have an upward convex surface, and
   the output plate has a lower-side end portion arranged in a vicinity of the vehicle front-side end portion of the cover portion, and an upper-side end portion arranged at a position higher than the cover portion.

5. The vehicular display device according to claim 2, wherein the cover portion is formed to have a downward convex surface, an outer surface of the output plate is formed to have an upward convex surface, and the output plate has a lower-side end portion arranged in a vicinity of the vehicle front-side end portion of the cover portion, and an upper-side end portion arranged at a position higher than the cover portion.

6. The vehicular display device according to claim 1, wherein, a diffusive asperity portion for diffusing incident light is formed on a surface of the output plate facing the reflecting plate.

7. The vehicular display device according to claim 6, wherein the cover portion is formed to have a downward convex surface, an outer surface of the output plate is formed to have an upward convex surface, and the output plate has a lower-side end portion arranged in a vicinity of the vehicle front-side end portion of the cover portion, and an upper-side end portion arranged at a position higher than the cover portion.

8. The vehicular display device according to claim 1, wherein the cover portion is formed to have a downward convex surface, an outer surface of the output plate is formed to have an upward convex surface, and the output plate has a lower-side end portion arranged in a vicinity of the vehicle front-side end portion of the cover portion, and an upper-side end portion arranged at a position higher than the cover portion.

\* \* \* \* \*